(12) United States Patent
Mangolini et al.

(10) Patent No.: US 11,152,608 B2
(45) Date of Patent: Oct. 19, 2021

(54) MODIFIED SILICON PARTICLE ELECTRODES AND METHODS

(71) Applicant: The Regents of the University of California, Oakland, CA (US)

(72) Inventors: Lorenzo Mangolini, Yorba Linda, CA (US); Lanlan Zhong, Santa Clara, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 43 days.

(21) Appl. No.: 16/306,244

(22) PCT Filed: May 31, 2017

(86) PCT No.: PCT/US2017/035272
§ 371 (c)(1),
(2) Date: Nov. 30, 2018

(87) PCT Pub. No.: WO2017/210336
PCT Pub. Date: Dec. 7, 2017

(65) Prior Publication Data
US 2019/0173077 A1    Jun. 6, 2019

Related U.S. Application Data

(60) Provisional application No. 62/343,702, filed on May 31, 2016.

(51) Int. Cl.
*H01M 4/134* (2010.01)
*H01M 4/36* (2006.01)
(Continued)

(52) U.S. Cl.
CPC ......... *H01M 4/134* (2013.01); *H01M 4/0471* (2013.01); *H01M 4/1395* (2013.01);
(Continued)

(58) Field of Classification Search
None
See application file for complete search history.

(56) References Cited

U.S. PATENT DOCUMENTS

| 7,745,047 B2 | 6/2010 | Zhamu et al. |
| 2009/0169994 A1 | 7/2009 | Mah et al. |
| 2011/0311873 A1 | 12/2011 | Schulz et al. |

FOREIGN PATENT DOCUMENTS

| CN | 102122708 A | 7/2011 |
| CN | 102479949 A | 5/2012 |

(Continued)

OTHER PUBLICATIONS

Rock et al (Synthesis and characterization of electrochemically active graphite-silicon-tin composite anodes for Li-ion applications; Journal of Power Sources 164, Available online Dec. 13, 2006; pp. 829-838). (Year: 2006).*

(Continued)

*Primary Examiner* — Sarah A. Slifka
(74) *Attorney, Agent, or Firm* — Schwegman Lundberg & Woessner, P.A.

(57) ABSTRACT

A silicon and tin based micro-structured material and methods are shown. In one example, the silicon and tin based micro-structured material is used as an electrode in a battery, such as a lithium ion battery.

4 Claims, 7 Drawing Sheets

(51) Int. Cl.
  *H01M 4/38* (2006.01)
  *H01M 10/052* (2010.01)
  *H01M 4/587* (2010.01)
  *H01M 4/04* (2006.01)
  *H01M 4/1395* (2010.01)
  *H01M 4/62* (2006.01)
  *H01M 10/0525* (2010.01)

(52) U.S. Cl.
  CPC ........... *H01M 4/364* (2013.01); *H01M 4/366* (2013.01); *H01M 4/386* (2013.01); *H01M 4/387* (2013.01); *H01M 4/587* (2013.01); *H01M 4/625* (2013.01); *H01M 10/052* (2013.01); *H01M 10/0525* (2013.01)

(56) References Cited

FOREIGN PATENT DOCUMENTS

| CN | 102637872 A | 8/2012 |
| CN | 103078092 A | 5/2013 |
| CN | 103782416 A | 5/2014 |
| CN | 109196706 A | 1/2019 |

OTHER PUBLICATIONS

Zhong et al (A stable silicon anode based on the uniform dispersion of quantum dots in a polymer matrix; Journal of Power Sources 273; Available online Feb. 10, 2014; pp. 638-644). (Year: 2014).*

International Application Serial No. PCT/US2017/035272, International Search Report dated Sep. 1, 2017, 2 pgs.

International Application Serial No. PCT/US2017/035272, Written Opinion dated Sep. 1, 2017, 4 pgs.

Rock, et al., "Synthesis and characterization of electrochemically active graphite-silicon-tin composite anodes for Li-ion applications", Journal of Power Sources, vol. 164, (Dec. 13, 2006), 829-838.

Zhong, et al., "A stable silicon anode based on the uniform dispersion of quantum dots in a polymer matrix", Journal of Power Sources, vol. 273, (Oct. 2, 2014), 638-644.

International Application Serial No. PCT/US2017/035272, International Preliminary Report on Patentability dated Dec. 13, 2018, 6 pgs.

Chinese Application Serial No. 201780033128.X, Office Action dated Dec. 25, 2020, w/ English translation, 17 pgs.

Al-Maghrabi, M A, et al., "A Combinatorial Study of the Sn—Si—C System for Li-Ion Battery Applications", Journal of the Electrochemical Society, 159(6), (Apr. 2, 2012), A711-A71.

Rock, Nicolaus L, et al., "Synthesis and characterization of electrochemically active graphite-silicon-tin composite anodes for Li-ion applications", Journal of Power Sources, 164(2), (2007), 829-838.

Wang, et al., "Preparation of Si/Sn-Based Nanoparticles Composited with Carbon Fibers and Improved Electrochemical Performance as Anode Materials", ACS Sustainable Chemistry & Engineering, vol. 2, (Aug. 28, 2014), 2310-2317.

Zhong, Lanlan, et al., "A stable silicon anode based on the uniform dispersion of quantum dots in a polymer matrix", Journal of Power Sources, 273, (Oct. 2, 2014), 638-644.

* cited by examiner

Figure 1. Capacity of Si-Sn nanocomposite anode compared to control samples (Si-only and Sn-only anodes)

MODIFIED SILICON PARTICLE ELECTRODES AND METHODS

CLAIM OF PRIORITY

This application is a U.S. National Stage Filing under 35 U.S.C. 371 from International Application No. PCT/US2017/035272, filed on May 31, 2017, and published as WO 2017/210336 A1 on Dec. 7, 2017, which claims the benefit of priority to U.S. Patent Application Ser. No. 62/343,702, filed on May 31, 2016, each of which is hereby incorporated by reference herein in its entirety.

TECHNICAL FIELD

This invention relates to silicon and tin based material microstructures and methods. In one example, this invention relates to silicon and tin based anodes for lithium ion batteries.

BACKGROUND

Improved batteries, such as lithium ion batteries are desired. One example of a battery structure that can be improved is an anode structure.

DETAILED DESCRIPTION

Figure 1:
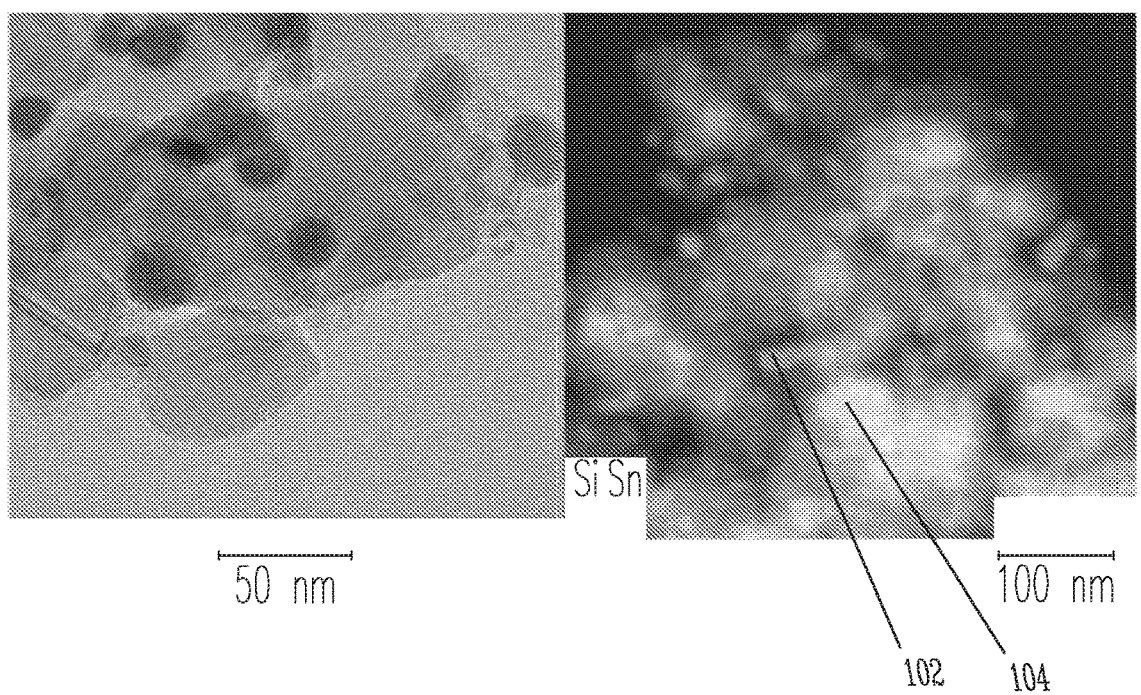
FIG. 1 shows elemental mapping of a battery electrode material according to an example of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

Carbon has been widely used as conductive materials for silicon in literature and our earlier stage studies. Yet, 1) amorphous carbon electric conductivity is not ideal; at the same time the carbon additive lower the overall specific capacity. We want to find a conductive material which also presents high lithium specific capacity. In this contribution, we describe a novel and promising approach that may bring materials such as silicon and tin closer to commercial utilization. Tin has good electrical conductivity but a theoretical capacity (994 mAh/g) that is lower than that of silicon (3579 mAh/g). We have therefore designed and tested a silicon-tin composite structure which overcomes the limitations of each of these two materials. These metal tin nanoparticles can increase the current density in active materials and ensured electrochemical reaction.

Although the examples discussed below primarily focus on tin particles, other materials and/or combinations of materials with a higher conductivity than silicon may also be used. A number of materials with higher conductivity than silicon are available that possess other desirable properties, such as an ability to lithiate sufficiently. If the particles added to silicon to not lithiate sufficientlythey may undesirably dilute an electrochemical capacity of an electrode. For example, copper has higher conductivity than silicon, but does not lithiate sufficienly, as compared to tin, and would dilute a capacity of an electrode.

In addition to tin, other acceptable particle material additives include, but are not limited to, magnesium, silver, zinc, aluminum, lead, antimony, and bismuth. Combinations or alloys of these materials may also be used. Although conductivity and electrochemical capacity of these materials is desireable, some of these materials have undesirable properties. For example, lead may be toxic, and silver is expensive. In one example, material selection of particles to mix with silicon balances these attributes for a given application.

Silicon nanoparticles (<100 nm), $SnCl_2.2H_2O$ (98%), PVP (Polyvinylpyrrolidone wt 40,000) were purchased from Sigma-Aldrich, and used as received. To prepare an SiNPs-SnNPs-CB-PVP (SSCP) electrode:

Si NPs and $SnCl_2.2H_2O$ powders (with Si:Sn wt % 10:1), typically 100 mg silicon, 19 mg $SnCl_2.2H_2O$ were weighted. 10 mg of carbon black was also added to the powder mixture. Carbon black (CB) Super P was purchased from Alfa Aesar. PVP were weighted (3× weight of Si+Sn particles, typically 357 mg) and dispersed in 5 ml of ethanol formed a clear and sticky solution. The SiNPs, $SnCl_2.2H2O$, CB powders were added to the PVP ethanol solution and probe-sonicated for 10 minutes to obtain a uniform and sticky slurry. The slurry was coated on a 4.5*4.5 $cm^2$ carbon coated copper foil (from MTI Corp.) via Mayer rod technique and ethanol was evaporated in <5 mins. The dried electrode is shown in FIG. 1, the brownish electrode material coating is very uniform. SiNPs-CB-PVP (SCP) electrodes were prepared similarly but without $SnCl_2.2H2O$ powders.

Control experiments: Preparation of SiNPs-PVP (100 mg SiNPs, 300 mg PVP), SnNPs-PVP (100 mg $SnCl_2.2H_2O$, 300 mg PVP), SiNPs-SnNPs-PVP (100 mg silicon, 19 mg $SnCl_2.2H_2O$, 357 mg PVP) electrodes were prepared in similarly as above. All the electrodes mentioned above were annealed at 700° C. under Ar environment for 15 mins to convert $SnCl_2$ to Sn and PVP to amorphous carbon.

The CR2032 typed coin cell were assembled in a Ar-filled glove-box with these working electrodes, polymer separator (MTI) and Li metal (Alfa Aesar) as counter electrode. 1 M $LiPF6$ in 90 vol % 1:1 v/v ethylene carbonate/diethyl carbonate (Sigma-Aldrich) and 10 vol % fluoroethylene carbonate (Solvay S.A., Belgium) was added as the electrolyte. Coin cells were loaded and cycled between 0.01 V and 1.5 V using an Arbin potentiostat. Cyclic voltammetry (CV) is performed at a sweeping rate of 0.1 mV/s on Gamry tester.

Figure 2:
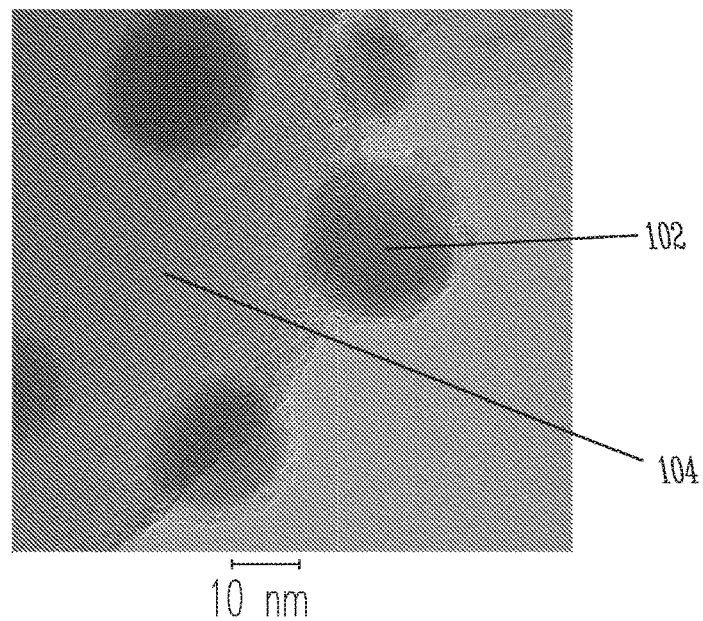
FIG. 2 shows TEM imaging of a battery electrode material according to an example of the invention.

Herein, $SnCl_2$ is used as SnNPs precursor for these electrodes. As explained in previous part, SnNPs would further enhance the electrode conductivity of the electrode and the SEI. Moreover, SnNPs can help convert electrons after silicon nanoparticles "agglomerate". In order to analysis the composition of SSCP electrode, XRD and TEM were performed on SSCP powders after thermal annealing. FIG. 2a) shows TEM image of the powders. The darker particles with diameter of ~15 nm is Sn nanoparticles. These commercial Si nanoparticles are larger and have irregular shapes. (Inset) shown the lattice diffraction of silicon and tin nanoparticles. FIG. 2 is higher magnification TEM image of the same material. In the higher resolution image, amorphous carbon (aC) can be observed on SiNPs and SnNPs surface. aC come from the reduction of PVP, previous study shows PVP has 5 wt % aC residue after annealed at high temperature under argon. FIG. 2 is the elemental mapping of this materials, ~15 nm SnNPs 102 were dispersed around Silicon nanoparticles 104.

Figure 3:
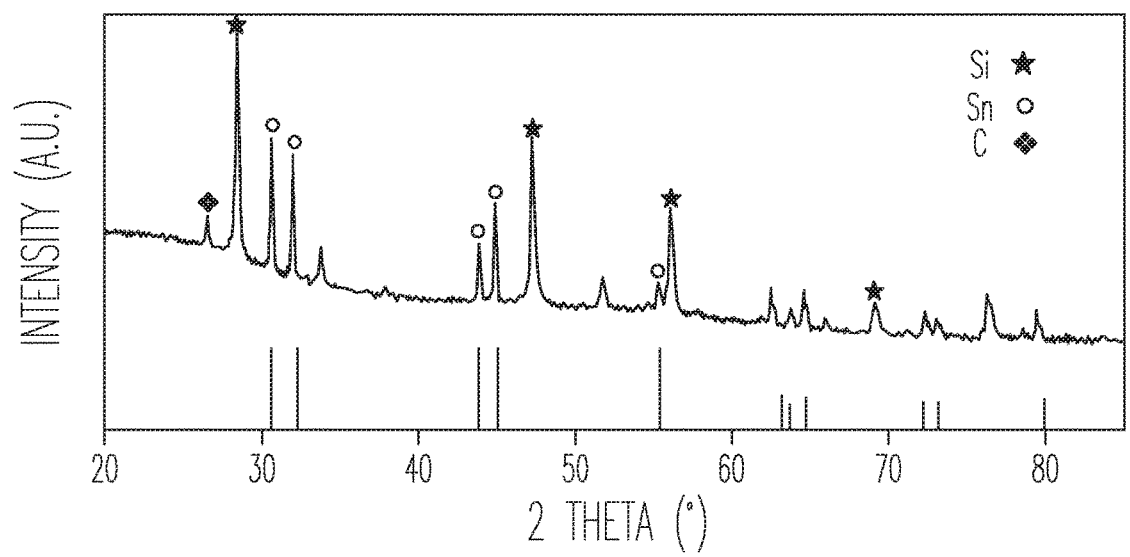
FIG. 3 shows XRD analysis of a battery electrode material according to an example of the invention.

FIG. 3 displays the XRD spectrum for SSCP powders after thermal annealing at 700° C. It shows peaks due to the metal Sn nanocrystals ([200] at 30.5°, [101] at 32°, [220] at 44°, [211] at 45° and [301] at 560). The peak assignment is based on the ICSD databse (Inorganic crystal structure database FIZ Karlsruhe). We could resolve contribution from crystalline carbon at 26.5°, which is from the commercial carbon coating on copper foil. Beside tin and carbon, there are peaks at 280, 47°, 56° and 68° which can be assign to silicon nanoparticles. The XRD analysis are consistent with TEM results, indicates the electrodes are SiNPs-SnNPs-CB-aC composites. The melting point of metal tin is 231.9° C. Thus tin were liquid phase before the electrode cool down to 231.9° C., the liquid could have been evaporated at 700° C. Yet, we observed from XRD and TEM images metal Sn existing in sphere morphology with an average diameter of ~15 nm. This is because of: PVP were uniformly wrapped around all the particles as coated. Thus after annealing at 700° C., the amorphous carbon residue from PVP degradation were wrapped around the liquid tin and preventing tin from evaporating or growing together.

Figure 4:
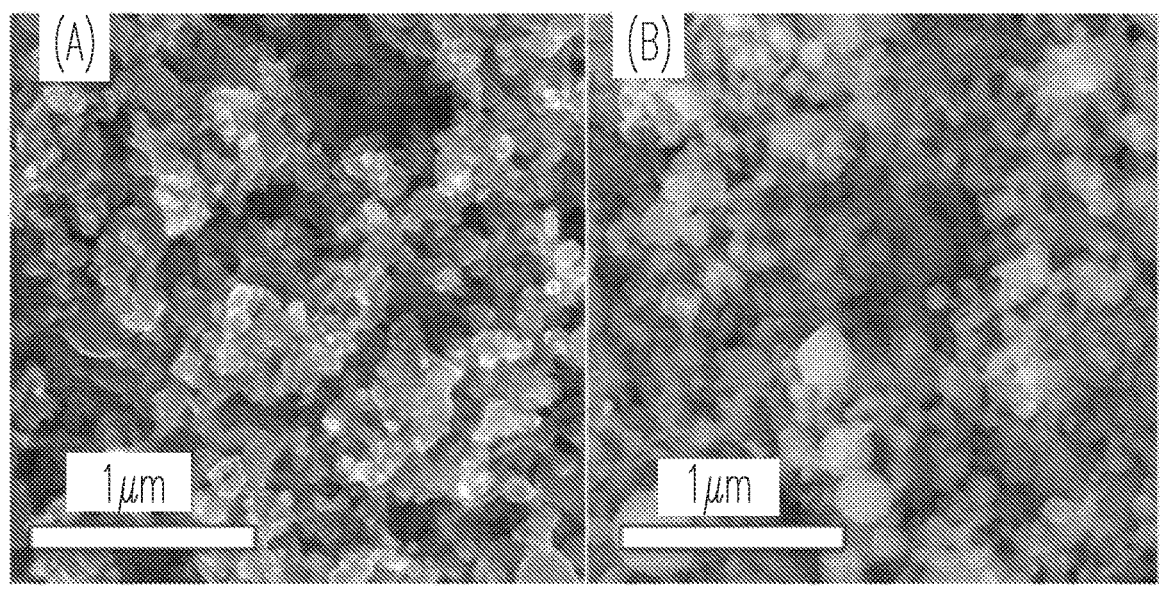
FIG. 4 shows SEM images of of a battery electrode material according to an example of the invention.

FIG. 4a) is the SEM morphology of SSCP electrode after annealing. The brighter dots are aC-SnNPs while the dark gray particles are aC coated SiNPs. Top morphology of SCP electrode was illustrated in Figure. 4b). The electrode is composition of aC-SiNPs and carbon black. 95 wt % PVP was consumed during thermal annealing process left the porous nature of SSCP and SCP electrodes as indicated in FIG. 4.

Figure 5A:
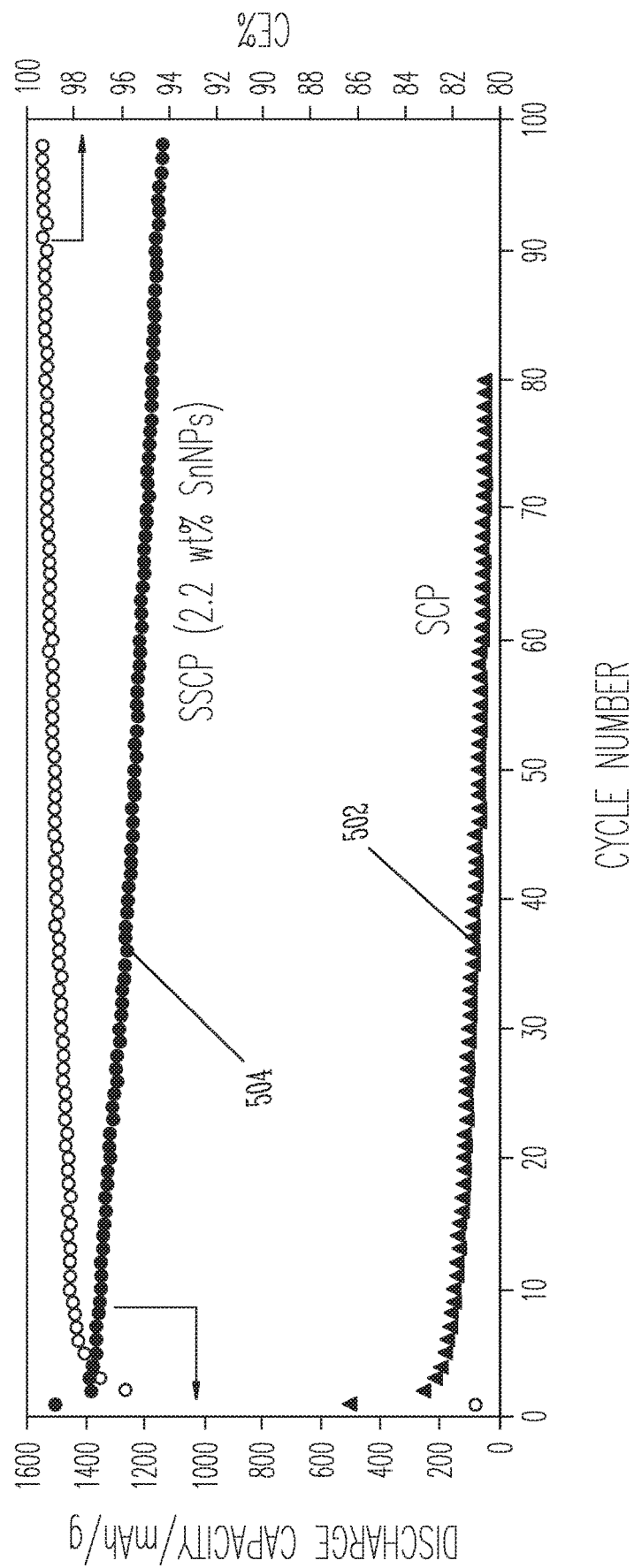
FIG. 5A shows electrical analysis of a battery electrode material according to an example of the invention.
Figure 5B:
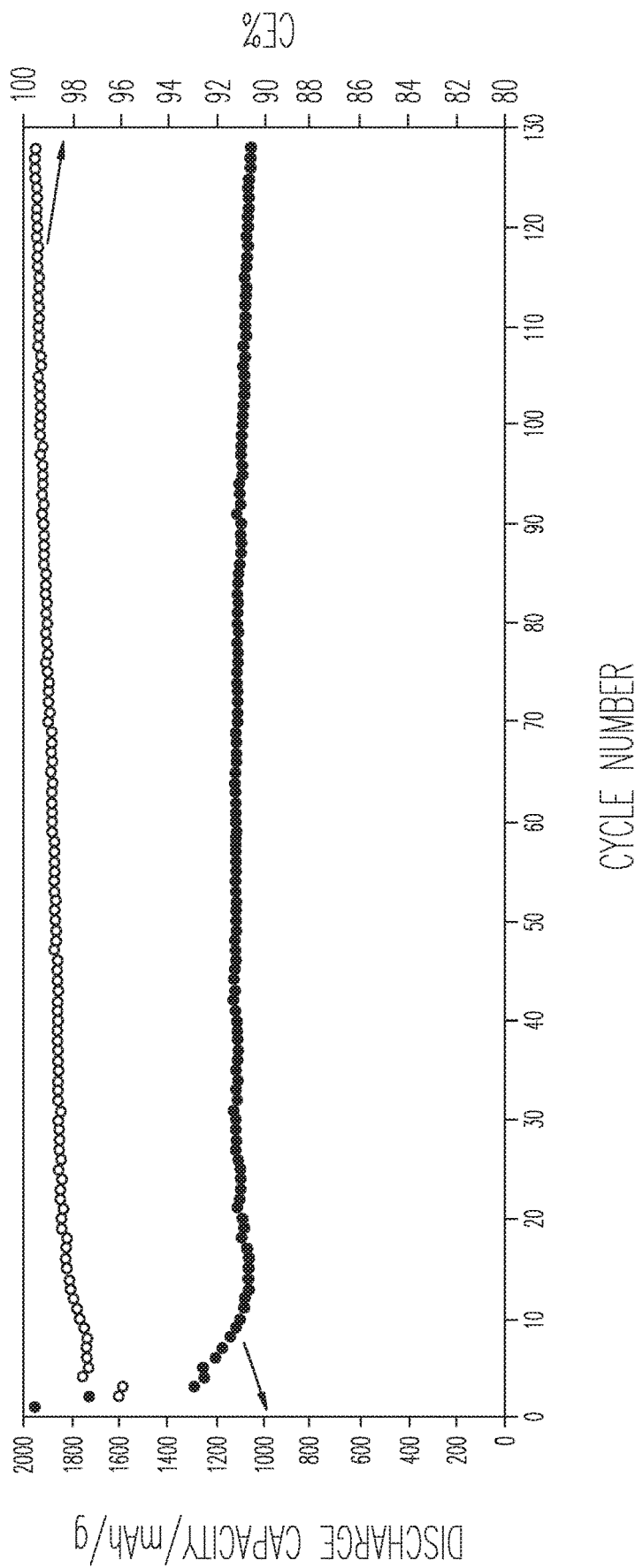
FIG. 5B shows additional electrical analysis of a battery electrode material according to an example of the invention.

The electrochemical performance of SSCP (2.2 wt % SnNPs) and SCP electrodes are shown in FIGS. 5A and 5B. In FIG. 5A, the SSCP and SCP electrodes were cycled at 0.1C based on the theoretical capacity of the active materials. The SSCP electrode (504) performed superior of SCP (502) electrode on specific capacity and cycle stability. For the former electrode, the first cycle discharge capacity and coulombic efficiency are 1509 mAh/g and 81%, respectively while SCP only has an initial discharge capacity of 500 mAh/g. The SSCP electrode exhibits stable cycling. And maintain a >1150 mAh/g for the first 100 cycles. After 100 cycles, the specific capacity retention rate is 75.8% compare to the first cycle. In contrast the SCP electrode shows a fast capacity fading and soon decay to below 200 mAh/g. FIG. 5B shown the cycle performance of SSCP (2.2 wt %) electrode cycled at a much higher C rate, 1C. The battery maintain a capacity above 1000 mAh/g over 130 cycles and the Coulombic efficiency reached 99.5% after 120 cycles.

FIG. 5A (502) depicts the fast capacity fading of SCP electrode. The lower capacity and unstable cycle performance of SCP are because of the low conductivity in-between particles. Carbon black additives were added to improve electronic connectivity between particles. However, the effect of carbon black as conductive materials and framework for silicon nanoparticles is limited. Simply mixing of carbon black and SiNPs as active materials is not an effective way of obtaining stable galvanostatic cyclability. This is consistent with previous studies in literature.

FIG. 5A The galvanostatic discharge capacity performance of SSCP electrode (504) and SCP electrode (502) cycled at 0.1C rate. In FIG. 5B, the cycle performance of SSCP electrode cycled at 1C rate. All specific capacity were calculated based on total weight. (Bottom) Cyclic voltammetry of SSCP electrode, sweep rate: 0.05 mV/s.

Figure 6:
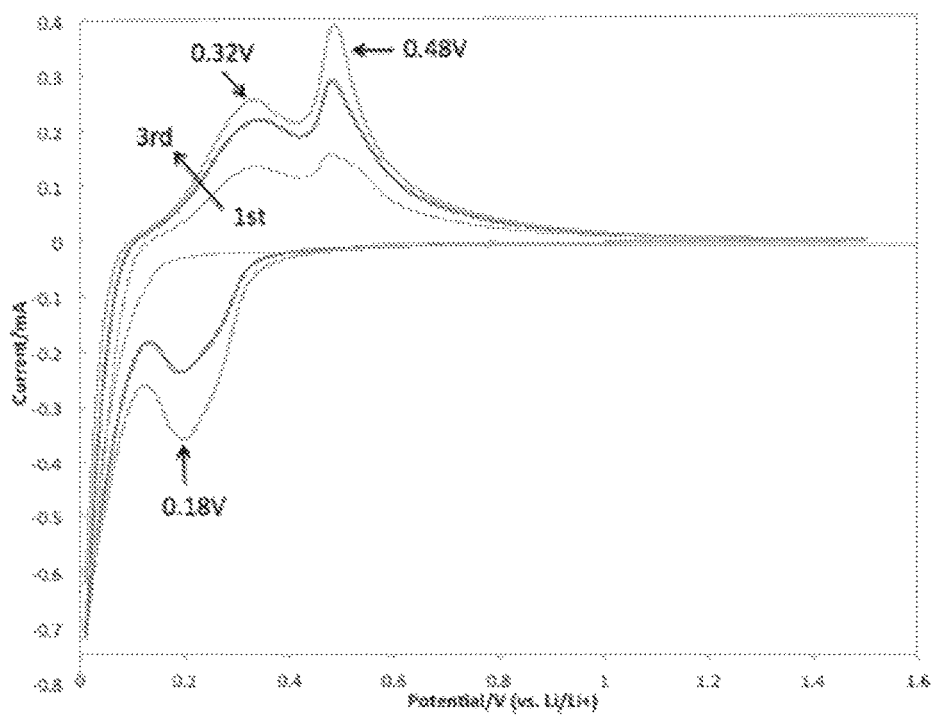
FIG. 6 shows galvanostatic discharge capacity of a battery electrode material according to an example of the invention.

FIG. 6 depicts the results of the cyclic voltammetry measurements from the $1^{st}$ cycle to the $3^{rd}$ cycle. Delithiation peak is at 0.18 V with a shoulder towards 0.3V; and two oxidation peaks are 0.32V and 0.48V. The lithiation peak at 0.18V and oxidation peaks at 0.32V, 0.48V are corresponding to lithium ions insertion and extraction from silicon nanoparticles, respectively. In theory, the lithiation peaks of tin are at 0.37V and 0.62V, while oxidation peaks at 0.67V and 0.8V are delithiation peaks of tin. However, we didn't see any SnNPs peaks in our SSCP (2.2 wt % SnNPs) electrodes. This is likely due to the low weight percentage of tin in total electrode materials.

SSCP composites were successfully fabricated. The SSCP electrode with very small amount of SnNPs additive shows much stable cycleability and higher specific energy compare with the anode made of SCP are because of the high electrical conductivity of SnNPs which can increase the SEI conductivity and enhance the interconnection of SiNPs. Thus increase the current density in active materials to ensure electrochemical reaction. The result shows that besides carbon materials, conductive metal nanoparticles with high lithium ion specific capacity could be good candidates to be used as conductive additive in anode materials. This work also indicates Si/Sn alloy particles may work even better as next generation anode materials.

A synergistic effect leads to improved-performance in anodes for lithium-ion batteries composed of tin and silicon particles. Each of these two elements has been investigated as a potential replacement of graphite for anode applications. Silicon has been widely researched because of its high gravimetric capacity (~3700 Ah/g). Several limitations have delayed its use in commercial applications. Among others, the poor electrical conductivity of silicon reduces its performance at high-rate of charging discharging, and also negatively affects its long-term stability. Tin has also been intensively investigated because of its gravimetric capacity (~900 mAh/g), which exceeds that of graphite but is significantly lower than that of silicon. One important advantage of tin with respect of silicon is its higher conductivity.

Figure 7:
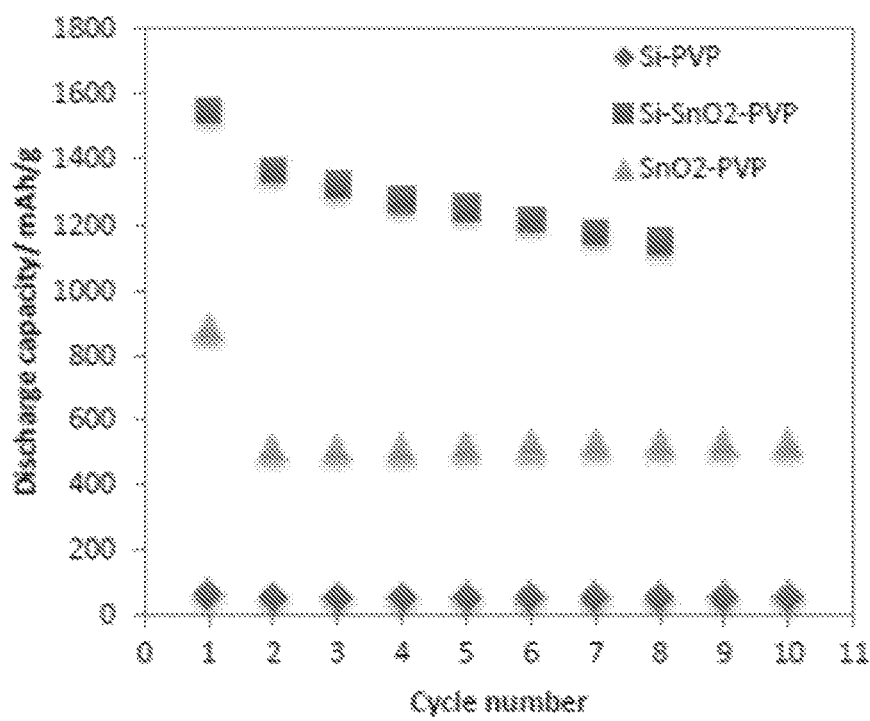
FIG. 7. shows capacity of Si—Sn nanocomposite anode compared to control samples (Si-only and Sn-only anodes) according to an example of the invention FIG. 8. shows cyclic voltammetry for the Si—Sn nanocomposite according to an example of the invention.
Figure 8:
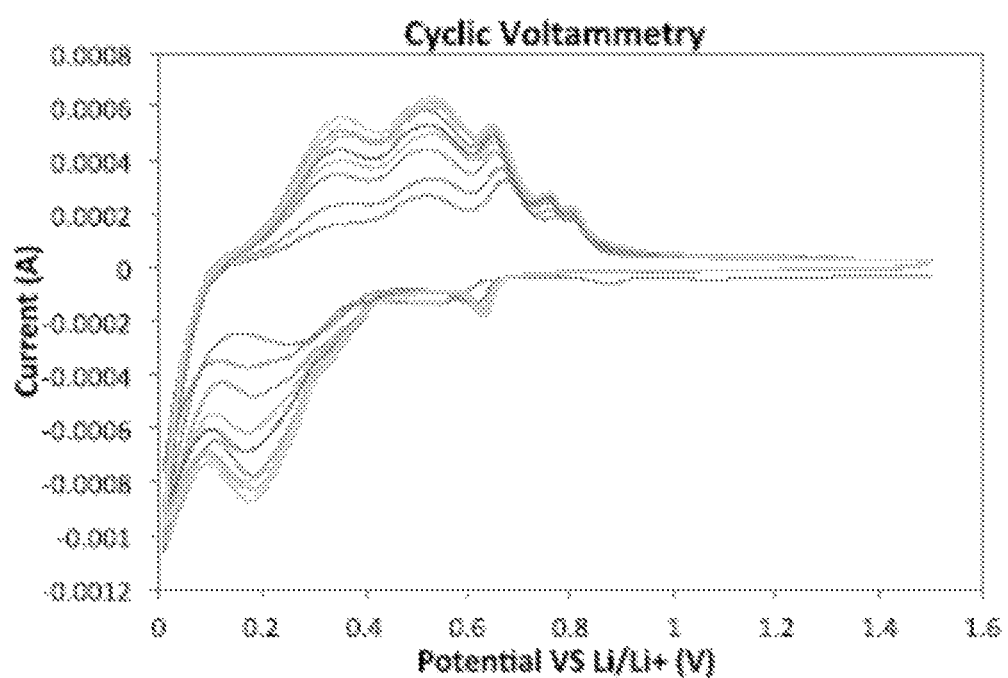

We have produced silicon-only, tin-only and silicon-tin composite (50%-50% by weight) anodes and tested them in coin cells. Commercial silicon nanopowder has been mixed with polyvinylpyrrolidone (PVP) in ethanol and coated onto copper foil, then annealed in inert atmosphere for 15 minutes at 670° C. The weight loading for this test structure is around 1 mg/cm2. This structure has very poor stability, with its capacity dropping to <100 mAh/g already at the first cycle (see FIG. 1). For the tin only device, we used commercial tin oxide nanopowder also mixed with PVP and ethanol. The same coating and annealing procedure were followed. During annealing, PVP acts as a reducing agent leading to the formation of tin nanoparticles dispersed in a carbon matrix. An anode based on this structure shows a capacity of 500 mAh/g at cycle 2 with good stability (see FIG. 7).

We have also tested tin dichloride as a tin precursor and obtained similar results. Finally, we mixed commercial silicon and tin oxide nanopowders by ball milling. We then mixed them in an ethanol based solution with PVP, applied to copper foil and annealed under the same conditions as for the two control samples. Anodes based on this structure have a capacity that is significantly higher than that of either the Si-only or Sn-only anodes (see FIG. 7). Cyclic voltammetry shown in FIG. 2 confirms that both silicon and tin participate in the lithiation-delithiation cycle.

The addition of conductive elements such as carbon black to Si-containing anodes has been shown to lead to improved device stability. Unfortunately such additives do not participate in the lithiation delithiation reaction, resulting in a loss of capacity (both gravimetric and volumetric). The use of tin as an additive allows overcoming this limitation. The preparation technique described here allows achieving a good mixture of silicon and tin, which is crucial for maximizing the device performance. This technique enables the formation of the tin particles insitu, during the thermal annealing process, starting from either tin oxide particles or from tin dichloride as precursors.

Additional improvements in battery performance (capacity and stability) can be achieved by using smaller silicon particles with optimized surface functionalization. This enables creating a uniform dispersion of silicon particles into the solvent of choice, such as ethanol. Mixing of the composing elements (for instance, tin dichloride, PVP and functionalized silicon nanoparticles) allows obtaining an optimally mixed nanocomposite after coating and annealing of the mixture.

While silicon and tin have limitations when used as anodes for lithium ion batteries (silicon have poor electrical conductivity while tin has poor capacity), a composite of silicon and tin can overcome these limitations. Silicon-tin nanocomposites show higher performance as anodes compared to each of the composing elements used individually.

Figure 9:
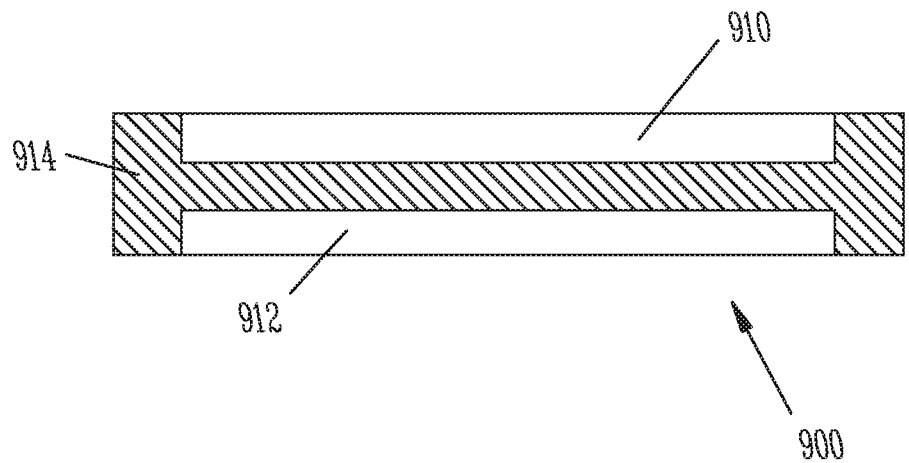
FIG. 9 shows a battery according to an example of the invention.

FIG. 9 shows an example of a battery 900 according to an embodiment of the invention. The battery 900 is shown including an anode 910 and a cathode 912. An electrolyte 914 is shown between the anode 910 and the cathode 912. In one example, the battery 900 is a lithium-ion battery. In one example, the anode 910 is formed from a porous silicon fiber as described in examples above. In one example, although the invention is not so limited, the battery 900 is formed to comply with a 2032 coin type form factor.

Figure 10:
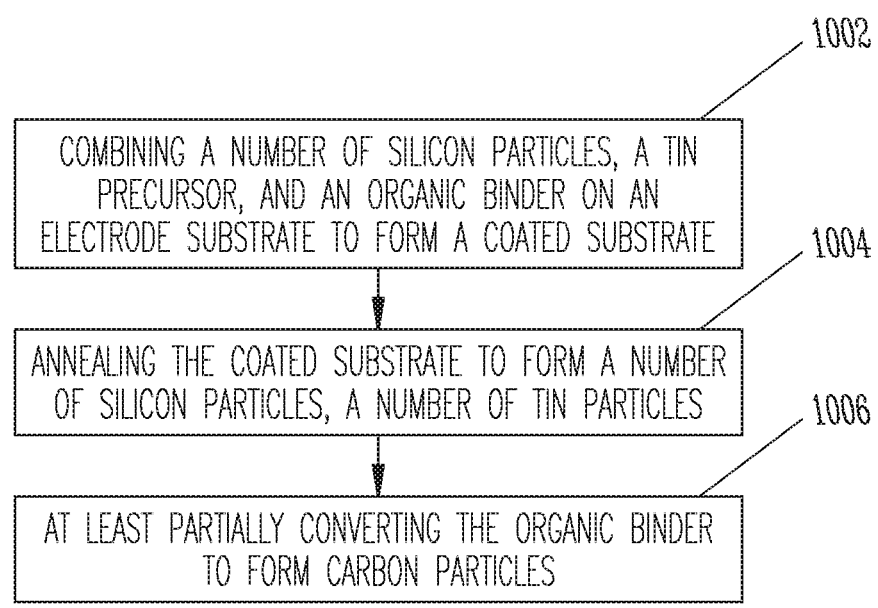
FIG. 10 shows a method of forming a material according to an example of the invention.

FIG. 10 shows an example method of forming according to an embodiment of the invention. In operation 1002, a number of silicon particles, a tin precursor, and an organic binder are combined on an electrode substrate to form a coated substrate. In operation 1004 the coated substrate is annealed to form a number of silicon particles, a number of tin particles. In operation 1006 the organic binder is at least partially converted to form carbon particles.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A battery, comprising:
   a first electrode, including:
   a number of silicon particles;
   a number of tin particles in sphere morphology on a surface of the silicon particles;
   a second electrode; and
   an electrolyte in contact with both the first electrode and the second electrode.

2. The battery of claim 1, wherein the first electrode further includes a number of carbon black particles.

3. The battery of claim 1, wherein the first electrode further includes amorphous carbon.

4. The battery of claim 1, wherein the number of silicon particles and the number of tin particles are wrapped with amorphous carbon.

* * * * *